United States Patent
Morino et al.

(10) Patent No.: US 12,479,502 B2
(45) Date of Patent: Nov. 25, 2025

(54) CONTROL DEVICE FOR FOUR-WHEEL STEERING VEHICLE

(71) Applicant: TOYOTA JIDOSHA KABUSHIKI KAISHA, Toyota (JP)

(72) Inventors: Tetsuya Morino, Susono (JP); Kazuya Suzuki, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 18/514,121

(22) Filed: Nov. 20, 2023

(65) Prior Publication Data
US 2024/0278829 A1 Aug. 22, 2024

(30) Foreign Application Priority Data
Feb. 16, 2023 (JP) .................................. 2023-022203

(51) Int. Cl.
*B62D 6/02* (2006.01)
*B62D 7/14* (2006.01)

(52) U.S. Cl.
CPC ........ *B62D 6/02* (2013.01); *B62D 7/14* (2013.01)

(58) Field of Classification Search
CPC . B62D 6/02; B62D 7/14; B62D 7/159; B62D 6/002
USPC ........................................................ 701/41
See application file for complete search history.

(56) References Cited

U.S. PATENT DOCUMENTS

| | | | |
|---|---|---|---|
| 2009/0248248 A1* | 10/2009 | Akuta | B60W 30/18145 701/41 |
| 2016/0107683 A1* | 4/2016 | Lee | B62D 7/159 701/41 |
| 2023/0118507 A1 | 4/2023 | Morino et al. | |

FOREIGN PATENT DOCUMENTS

| | | |
|---|---|---|
| JP | 2009-280102 A | 12/2009 |
| JP | 2013-129262 A | 7/2013 |
| JP | 2022-041538 A | 3/2022 |
| JP | 2023-061058 A | 5/2023 |

* cited by examiner

*Primary Examiner* — Scott A Reinbold
(74) *Attorney, Agent, or Firm* — SoraIP, Inc.

(57) ABSTRACT

A control device for a four-wheel steering vehicle including a steering wheel, a front wheel steering device, and a rear wheel steering device, and operating the front wheel steering device and the rear wheel steering device, wherein first steering and second steering are continuously performed, and when the rear wheels are steered in the direction opposite to the steering direction of the front wheels, the absolute value of the steered angle velocity of the front wheels to be steered is higher than the first threshold, and the absolute value of the steered angle velocity of the front wheels to be steered in response to the second steering is higher than the second threshold, the steering of the rear wheels corresponding to the second steering is restricted.

6 Claims, 6 Drawing Sheets

CONTROL DEVICE FOR FOUR-WHEEL STEERING VEHICLE

CROSS-REFERENCE TO RELATED APPLICATION

This application claims priority to Japanese Patent Application No. 2023-022203 filed on Feb. 16, 2023, incorporated herein by reference in its entirety.

BACKGROUND

1. Technical Field

The present disclosure relates to a control device for a vehicle (four-wheel steering vehicle) capable of steering both front and rear wheels.

2. Description of Related Art

Japanese Unexamined Patent Application Publication No. 2009-280102 (JP 2009-280102 A) describes a steering control device for a vehicle (four-wheel steering vehicle) including a four-wheel steering mechanism. The four-wheel steering vehicle described in JP 2009-280102 A includes a front wheel steering device, a rear wheel steering device, a variable gear ratio steering device (VGRS device), and the like. The VGRS device is an auxiliary steering device for realizing so-called active steering. The VGRS device corrects a steering angle or automatically controls a steered angle so that the steered angle of front wheels agrees with a target steering angle. The VGRS device can change a steering gear ratio of the steering device. In the steering control device described in JP 2009-280102 A, the steering angle of rear wheels is controlled to turn the rear wheels in phase (same turning direction) with or in the opposite phase (opposite turning direction) to the turning direction of the front wheels based on travel conditions of the vehicle. A state in which the vehicle is to be moved laterally is detected, and a target distance of lateral movement is determined. When the state in which the vehicle is to be moved laterally is detected, the rear wheels are turned in the opposite phase to the front wheels for a period determined based on the target movement distance to delay the timing to turn the rear wheels in phase with the front wheels.

Japanese Unexamined Patent Application Publication No. 2013-129262 (JP 2013-129262 A) describes a steering assist control device for a four-wheel steering vehicle. The steering assist control device described in JP 2013-129262 A includes an electric power steering device and a steered angle changing device. The steered angle changing device turns front wheels relatively and assistively in response to rotation of a steering wheel. The steered angle changing device also functions as a variable gear ratio steering device (VGRS device) or a steering transmission ratio changing device that increases or reduces a steering gear ratio or a steering transmission ratio. The steering assist control device described in JP 2013-129262 A changes a steering control rule for the rear wheels depending on travel conditions. Specifically, when the curvature of a travel road is large, the steering control rule for the rear wheels is set to a standard first control rule. When the curvature of the travel road is small, the steering control rule for the rear wheels is set to a second control rule different from the first control rule. As a result, the assist characteristics of the steering assist device are changed in response to a change in the steering characteristics along with the change in the steering control rule for the rear wheels.

Japanese Unexamined Patent Application Publication No. 2022-41538 (JP 2022-41538 A) describes a steer-by-wire steering device and a vehicle steering control device that controls the steering device. The steer-by-wire steering device described in JP 2022-41538 A includes a steering angle detection device that detects a rotation angle (steering angle) of a steering wheel, a reaction force actuator that applies a steering reaction torque to the steering wheel, a steering operation mechanism that turns steered wheels by receiving a steering operation torque, a steering operation actuator that applies the steering operation torque to the steering operation mechanism, and a steering angle detection device that detects a steering angle of the steered wheels. The vehicle steering control device described in JP 2022-41538 A electrically controls the reaction force actuator and the steering operation actuator of the steering device. Specifically, when the steering mode is a manual steering mode, the vehicle steering control device sets the steering gear ratio to a preset standard steering gear ratio, and controls the steering angle of the steered wheels based on the steering angle detected by the steering angle detection device. When the steering mode is an automatic steering mode, a target steering angle of the steered wheels is calculated, the steering gear ratio is set to a steering gear ratio during automatic steering that is smaller than the standard steering gear ratio, and control is performed so that the steering angle of the steered wheels reaches the target steering angle.

SUMMARY

In the four-wheel steering vehicle including the rear wheel steering system as described in JP 2009-280102 A and JP 2013-129262 A, the rear wheels are generally turned in the opposite direction (opposite phase) to that of the front wheels during low-speed travel. By this operation, a yaw moment is generated in the turning direction of the vehicle, and the turning radius of the vehicle can be reduced. During high-speed travel, the rear wheels are turned in the same direction (in phase) as that of the front wheels. By this operation, the yawing of the vehicle during steering is reduced, and the steering stability of the vehicle can be improved.

A four-wheel steering vehicle capable of quick steering can be constructed by applying the variable gear ratio steering device or the steer-by-wire steering device to the above four-wheel steering vehicle and setting a low steering gear ratio. In a motion system of the four-wheel steering vehicle with the low steering gear ratio, however, when the vehicle is steered at a predetermined frequency (steering speed, steering direction), resonance may occur and the behavior of the vehicle may be disturbed. For example, as shown in a time chart of FIG. 1, during low-speed travel, when steering is performed in a predetermined direction (first steering) during a period from time t1 to time t2 and then successively in a direction opposite to that of the first steering (second steering) during a period from time t2 to time t3, the rear wheels are turned in the opposite phase to the turning direction of the front wheels. In this case, for example, in a four-wheel steering vehicle with a general steering gear ratio of about "15", the front wheels and the rear wheels are turned at a standard steered angle velocity based on waveforms (frequencies) of the first steering and the second steering, and a standard magnitude of lateral acceleration is generated. For example, in a four-wheel steering vehicle with a lower steering gear ratio of about "5", the front wheels and the rear wheels are turned at a steered angle velocity that is about three times the standard steered angle velocity. As a result, resonance may occur in the latter period of the second steering (near time t3), resulting in an excessive lateral acceleration. In the situation in which such an excessive lateral acceleration is applied, the ride comfort and steering stability of the four-wheel steering vehicle are impaired. When the front wheels and the rear wheels are turned in phase in the steering during high-speed travel, the above resonance problem does not occur.

The present disclosure has been devised with a focus on the above technical problems, and it is an object of the present disclosure to provide a control device for a four-wheel steering vehicle capable of appropriately steering front wheels and rear wheels regardless of a vehicle speed and a steering speed.

In order to achieve the above object, the present disclosure provides
a control device for a four-wheel steering vehicle that includes a manipulation device to be operated by a driver, a front wheel steering device configured to turn front wheels, and a rear wheel steering device configured to turn rear wheels, and that is configured to operate the front wheel steering device and the rear wheel steering device based on an operation state of the manipulation device. The control device includes
a controller configured to control the front wheel steering device and the rear wheel steering device.
The controller is configured to
when first steering in which the manipulation device is operated in a predetermined direction and second steering in which the manipulation device is operated in a direction opposite to the direction of the first steering are successively performed and the rear wheels are turned in a direction opposite to a turning direction of the front wheels,
restrict turning of the rear wheels in response to the second steering in a case where an absolute value of a steered angle velocity of the front wheels or the rear wheels that are turned in response to the first steering is higher than a predetermined first threshold value and an absolute value of a steered angle velocity of the front wheels or the rear wheels that are turned in response to the second steering is higher than a predetermined second threshold value.

In the present disclosure,
the controller may be configured to
restrict the turning of the rear wheels by fixing a steered angle of the rear wheels to zero or within a predetermined angle range.

In the present disclosure,
the controller may be configured to
restrict the turning of the rear wheels by reducing a steered amount of the rear wheels (for example, a change amount of the steered angle).

In the present disclosure,
the controller may be configured to
when a steering holding state in which a steering speed of the first steering tends to decrease or is zero (that is, the operation state of the manipulation device is maintained) continues for a predetermined period or longer after the first steering is performed, set steering for operating the manipulation device in any direction to the first steering again after the steering holding state.

In the present disclosure, the controller may be configured to
change magnitudes of the first threshold value and the second threshold value based on a vehicle speed of the four-wheel steering vehicle.

In the present disclosure,
the controller may be configured to
reduce the magnitudes of the first threshold value and the second threshold value as the vehicle speed increases.

The control device for the vehicle according to the present disclosure controls the front wheel steering device and the rear wheel steering device of the four-wheel steering vehicle capable of steering the rear wheels in addition to the steering of the front wheels. During low-speed travel, the front wheels and the rear wheels are turned in opposite directions (opposite phases). During high-speed travel, the front wheels and the rear wheels are turned in the same direction (in phase). As described above, in the four-wheel steering vehicle capable of quick steering by applying, for example, the variable gear ratio steering device or the steer-by-wire steering device and setting a steering gear ratio lower than usual, resonance is likely to occur when the front wheels and the rear wheels are turned in opposite phases. When such resonance occurs, an excessive lateral acceleration may be generated and the behavior of the vehicle may be disturbed. In the control device for the four-wheel steering vehicle according to the present disclosure, when the first steering and the second steering different in terms of steering directions are successively performed, the turning of the rear wheels in response to the second steering is restricted in the case where the absolute values of the steered angle velocities in response to the first steering and the second steering are higher than the predetermined threshold values. For example, the steered angle of the rear wheels is reduced. Therefore, even if steering that may cause the above resonance is performed, the occurrence of the resonance can be reduced by restricting the turning of the rear wheels. Thus, the four-wheel steering can be performed appropriately.

Specifically, the turning of the rear wheels can easily be restricted by fixing the steered angle of the rear wheels to or near zero or within the predetermined angle range. Alternatively, the turning of the rear wheels can easily be restricted by reducing the steered amount of the rear wheels (for example, the change amount of the steered angle).

When the steering holding state continues for the predetermined period or longer after the first steering is performed, that is, when the time interval between the first steering and the second steering increases, the control is executed again in such a manner that the second steering that has initially been set is newly set to the first steering. Therefore, it is possible to execute the control with high accuracy by appropriately discriminating the steering situation that may cause the above resonance.

The threshold values for the steered angle velocities for determining the steering state that may cause the above resonance are increased or reduced based on the vehicle speed. For example, the magnitudes of the first threshold value and the second threshold value are changed and set to decrease as the vehicle speed increases. Therefore, the control can be executed with high accuracy based on the vehicle speed.

With the control device for the four-wheel steering vehicle according to the present disclosure, it is possible to appropriately perform the four-wheel steering of the front wheels and the rear wheels by reducing the occurrence of the resonance regardless of the vehicle speed and the steering speed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described with reference to the drawings. It should be noted that the embodiment shown below is merely an example when the present disclosure is embodied, and does not limit the present disclosure.

Figure 1:
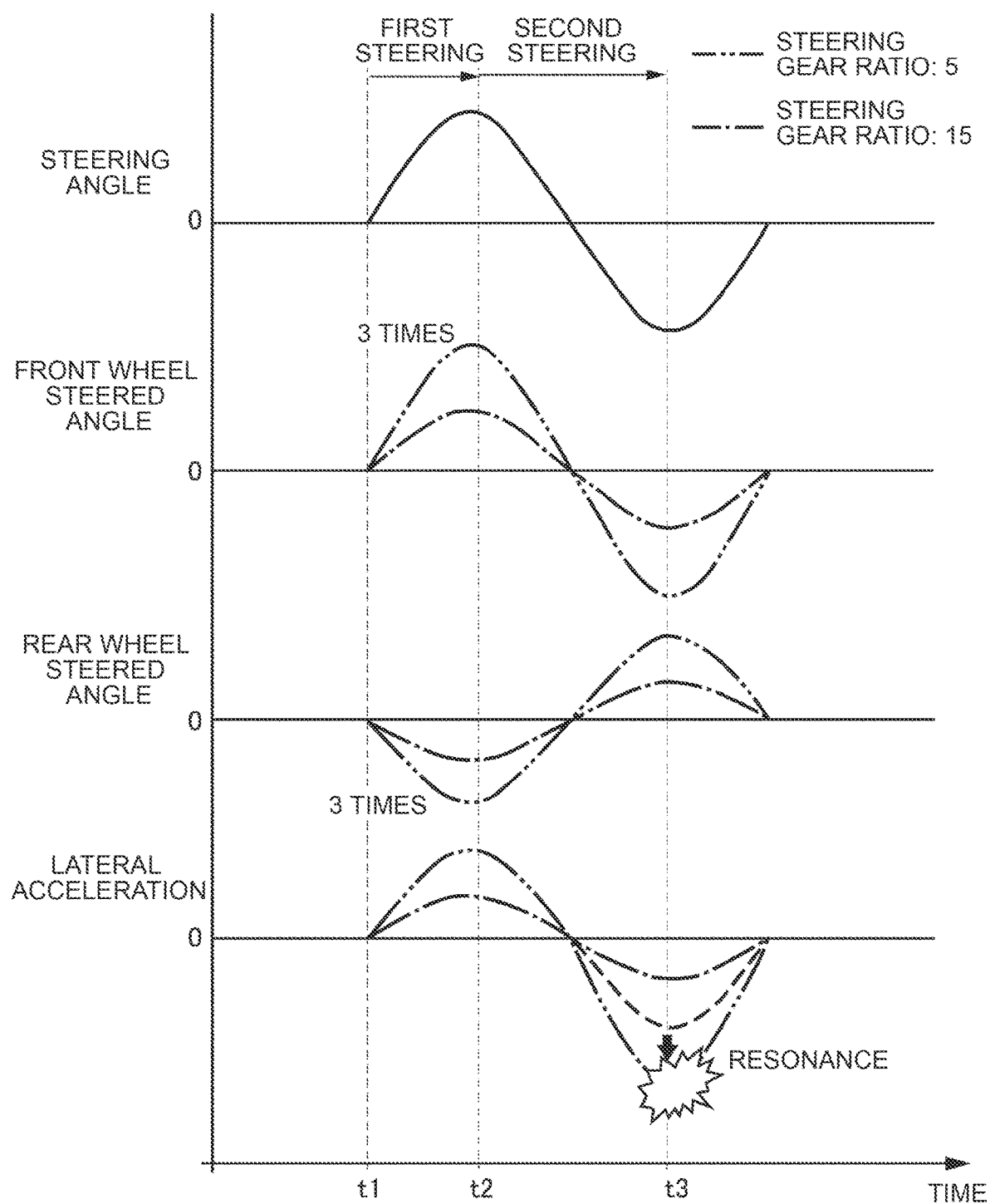
FIG. 1 is a time chart for explaining the problem of the related art (resonance occurs due to fast steering during low-speed driving, resulting in excessive lateral acceleration)
Figure 2:
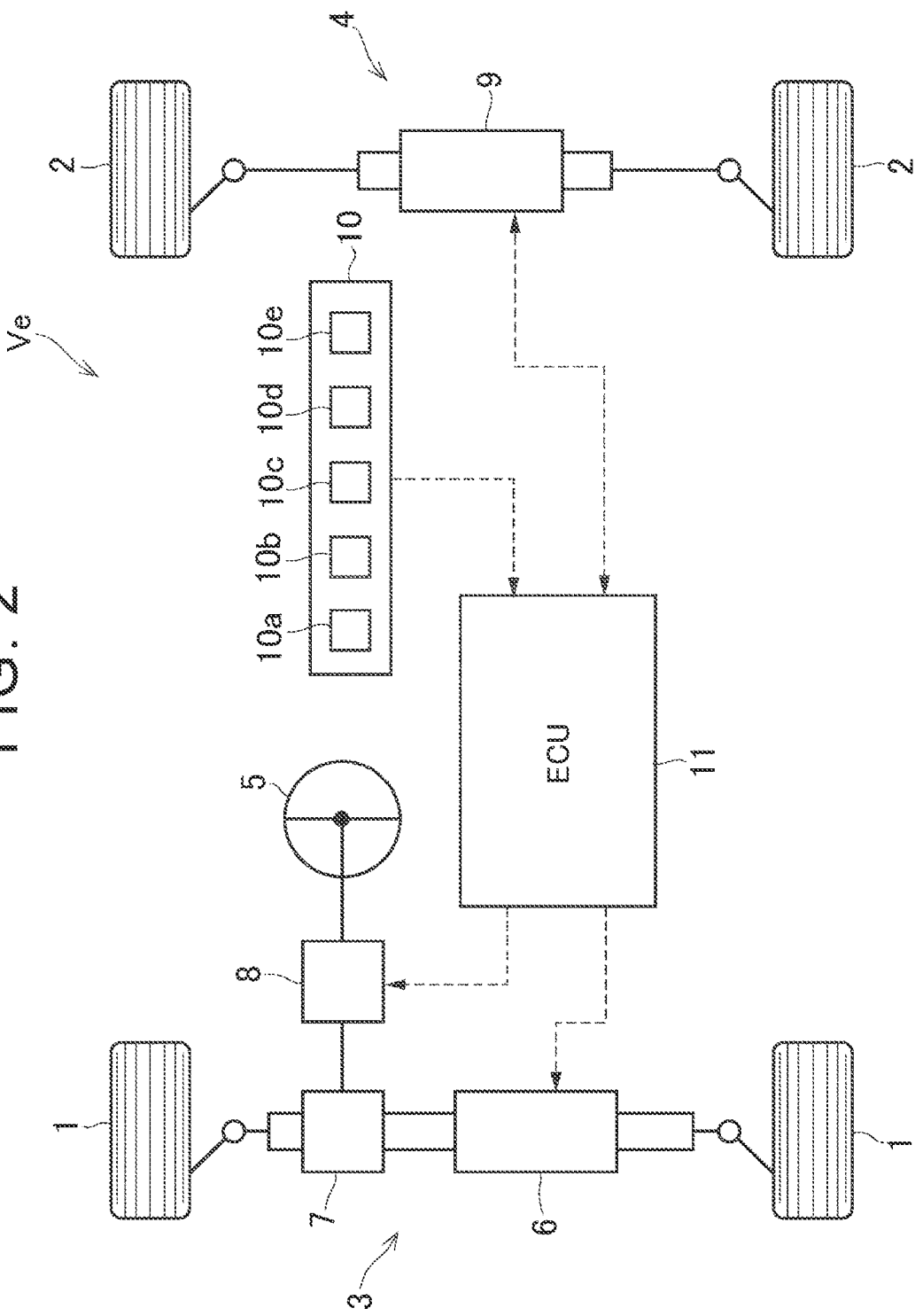
FIG. 2 is a block diagram schematically showing the general configuration of a four-wheel steering vehicle to be controlled by the control device for a four-wheel steering vehicle according to the present disclosure.

FIG. 2 shows a schematic configuration of a vehicle Ve to be controlled in this embodiment of the present disclosure. The vehicle Ve shown in FIG. 2 is a so-called "four-wheel steering vehicle" capable of steering both front wheels 1 and rear wheels 2. For this purpose, the vehicle Ve includes a front wheel steering device 3 for steering the front wheels 1 and a rear wheel steering device 4 for steering the rear wheels 2.

The front wheel steering device 3 steers the front wheels 1 according to the operation state of the "manipulation device" operated by the driver. In the example shown in FIG. 2, the front wheel steering device 3 has a steering wheel 5, an electric actuator 6, a steering gear box 7, a VGRS device 8, and the like. The electric actuator 6 assists steering by the steering wheel 5, and causes the front wheel steering device 3 to function as a so-called power steering device. The VGRS device 8 is, in other words, a "variable gear ratio steering system". The steering gear ratio of the front wheel steering device 3 can be changed. The front wheel steering device 3 steers the front wheels 1 in accordance with the steering state (steering angle or steering direction and steering amount) of the steering wheel 5, which corresponds to the "manipulation device" in the embodiment of the present disclosure.

The rear wheel steering device 4 steers the rear wheels 2 in conjunction with the steering operation of the front wheels 1 by the front wheel steering device 3. In the example shown in FIG. 2, the rear wheel steering device 4 has an electric actuator 9. The rear wheel steering device 4 is a kind of "steer-by-wire steering system". The rear wheel steering device 4 steers the rear wheels 2 based on the steering state of the steering wheel 5 and the running state of the vehicle Ve by operating the electric actuator 9 in response to an electric signal from the controller 11, which will be described later.

It should be noted that the vehicle Ve to be controlled in the embodiment of the present disclosure, for example, can apply the configuration of the "four-wheel steering vehicle" described in the above-mentioned JP 2009-280102 A or JP 2013-129262 A. In that case, the detailed configuration of the vehicle Ve is described in the specification of JP 2009-280102 A or JP 2013-129262 A.

Although not shown in FIG. 2, the vehicle Ve actually includes a driving force source such as an engine, a motor, or a hybrid drive unit, and a power transmission system that transmits the output torque of the driving force source to the driving wheels. The four-wheel steering vehicle control device according to the embodiment of the present disclosure can control any vehicle Ve of any drive system.

Further, the vehicle Ve includes a detection unit 10 and an electronic control unit (ECU) 11 to control the front wheel steering device 3 and the rear wheel steering device 4 based on the steering state of the steering wheel 5 and the running state of the vehicle Ve.

The detection unit 10 is a device or device for acquiring various data and information necessary for controlling the vehicle Ve. The detection unit 10 includes, for example, a power supply unit, microcomputer, sensor, input/output interface, and the like. In particular, the detection unit 10 in this embodiment of the present disclosure detects various data for controlling the front wheel steering device 3 and the rear wheel steering device 4. For example, the detection unit 10 includes various sensors and devices such as a vehicle speed sensor 10a for detecting vehicle speed, an acceleration sensor 10b for detecting acceleration of the vehicle Ve, a steering angle sensor 10c, a steered angle sensor 10d, and a timer 10e. The steering angle sensor 10c detects the steering angle of the steering wheel 5 or the rotation angle of a steering shaft (not shown). The steered angle sensor 10d detects the steered angles of the front wheels 1 and the rear wheels 2, respectively. The timer 10e detects the control time (for example, the steering time of the steering wheel 5 and the steering holding time during which the steering is held). The detection unit 10 is electrically connected to a controller 11, which will be described later, and outputs an electric signal or the like according to the detection value or calculated value of the various sensors, devices, devices, etc. as described above to the controller 11 as detection data.

The controller 11 is, for example, an electronic control device mainly composed of a microcomputer. The controller 11 in this embodiment of the present disclosure controls the vehicle Ve and, in particular, controls the front wheel steering device 3 and the rear wheel steering device 4. Various data and the like detected or calculated by the detection unit 10 are input to the controller 11. The controller 11 performs calculations using various types of input data, pre-stored data, calculation formulas, and the like. The controller 11 is configured to output the calculation result as a control command signal to control the vehicle Ve as described above. Although FIG. 2 shows an example in which one controller 11 is provided, a plurality of controllers 11 may be provided for each device or device to be controlled, or for each control content.

As described above, the control device for a four-wheel steering vehicle according to the embodiment of the present disclosure is used when steering in different steering directions is continuously performed and the front wheels 1 and rear wheels 2 are steered in opposite phases. Also, the purpose is to suppress the occurrence of resonance and the lateral acceleration or yaw rate of the vehicle Ve that increases due to the resonance. For this reason, the controller 11 of the vehicle Ve in this embodiment of the present disclosure is configured, for example, to execute the control shown in the following flowchart chart of FIG. 3.

Figure 3:
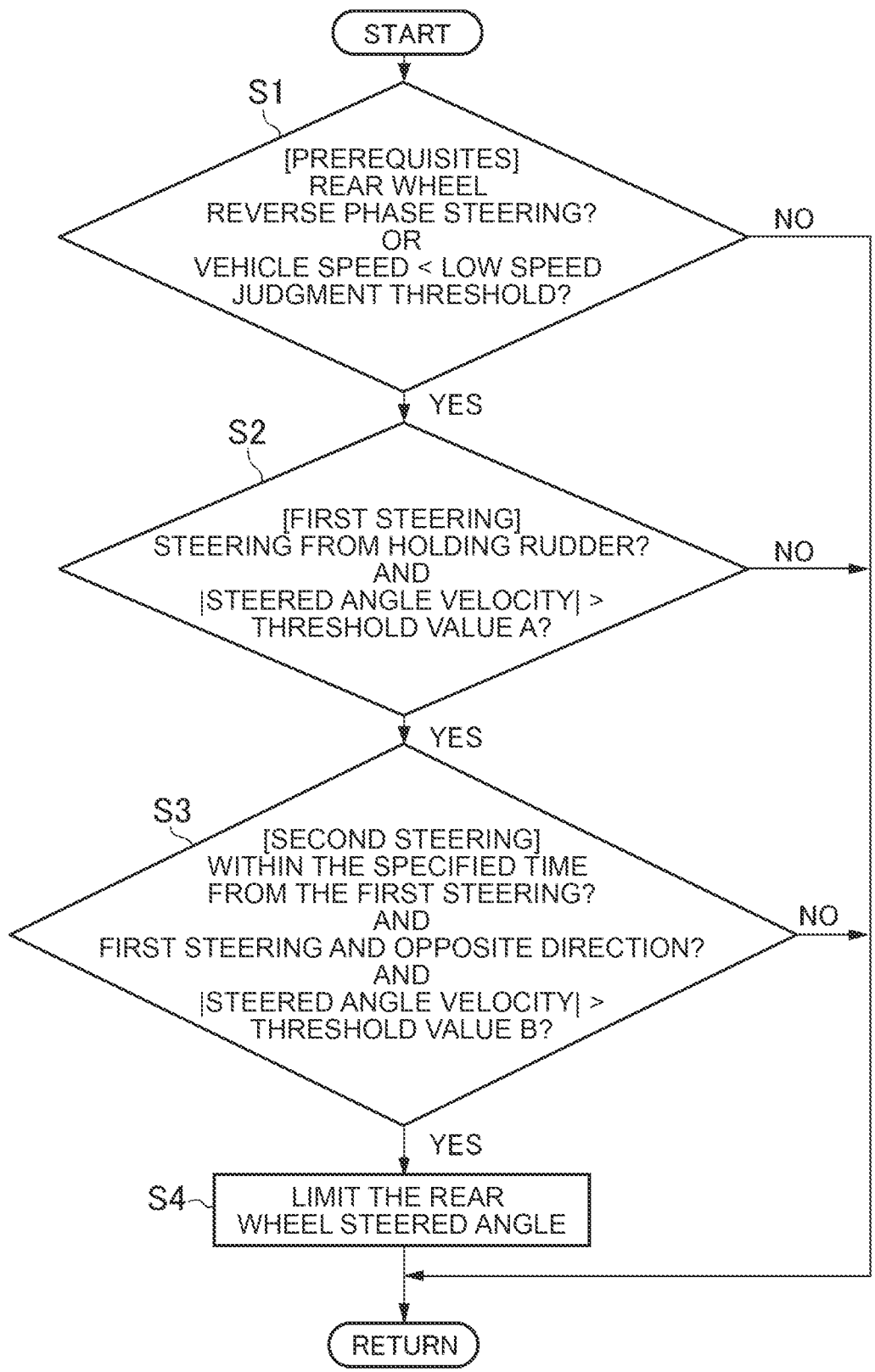
FIG. 3 is a flowchart for explaining an example of control executed by the control device for a four-wheel steering vehicle according to the present disclosure.

In the flowchart of FIG. 3, first, in S1, as a precondition for control, it is determined whether the rear wheels 2 are steered in the opposite phase to the front wheels 1, or whether the vehicle speed is lower than the low speed determination threshold. The vehicle Ve in the embodiment of the present disclosure, like a conventional "four-wheel steering vehicle", rotates the front wheels 1 and the rear wheels 2 in opposite directions when traveling at a low speed (that is, when the vehicle speed is lower than the low speed determination threshold value) (reverse phase). On the other hand, when traveling at high speed (that is, when the vehicle speed is equal to or higher than the low speed determination threshold value), the vehicle Ve steers the front wheels 1 and the rear wheels 2 in the same direction (in phase). The control shown in the flowchart of FIG. 3 is executed to suppress resonance when the front wheels 1 and rear wheels 2 are steered in opposite phases. Therefore, the situation is not one in which the rear wheels 2 are not steered in the opposite phase to the front wheels 1, or the vehicle speed is equal to or higher than the low speed determination threshold (i.e., the situation in which the front wheels 1 and the rear wheels 2 are steered in the same phase), so that the routine shown in the flowchart of FIG. 3 is temporarily terminated without executing the control of the subsequent steps when the determination is "No" in S1.

On the other hand, the situation is such that the rear wheels 2 are steered in the opposite phase to the front wheels 1, or the vehicle speed is less than the low speed determination threshold (that is, the front wheels 1 and the rear wheels 2 are turned in the opposite phase to each other). If the result of S1 is "Yes", the process proceeds to next S2.

In S2, it is determined whether the first steering is to be performed. In the four-wheel steering control according to the embodiment of the present disclosure, steering in any one of predetermined directions, that is, steering the vehicle Ve in either right or left turn, is defined as first steering. The second steering is defined as the steering in the direction opposite to the first steering performed following the steering. It is assumed that the first steering and the second steering are performed consecutively within a predetermined period of time. Therefore, if the second steering is not performed within a predetermined period of time after the first steering is performed, the steering that is first performed after the predetermined period of time has elapsed becomes the first steering again. Specifically, after the first steering is performed, if the steering speed of the first steering tends to decrease or the steering speed is maintained at 0 for a predetermined time or longer, after the steering speed is maintained, steering is first performed. Steering in which the wheel 5 is operated in either direction is again the first steering.

Therefore, in S2, to determine that the first steering is executed, it is determined that the current steering is the steering from the steering holding state that has continued for a predetermined time or longer, and the absolute value of the steered angle velocity of the front wheels 1 to be steered in response to the steering is higher than a predetermined threshold value A. If the current steering is from a steering holding state that has continued for a predetermined time or more and the absolute value of the steered angle velocity of the front wheels 1 is higher than the threshold value A, it is determined that the first steering has been performed. The threshold value A is a threshold value corresponding to the "first threshold value" in the embodiment of this present disclosure. Also, the threshold value A and the predetermined time are set in advance based on, for example, a running test using an actual vehicle, a simulation result, or the like. Instead of the steered angle velocity of the front wheels 1, the absolute value of the steered angle velocity of the rear wheels 2 and the threshold value A may be compared. Alternatively, the steered angle velocity of the front wheels 1 or the steered angle velocity of the rear wheels 2 may be estimated from the steering velocity or the steering angular velocity of the steering wheel 5, and the estimated value and the threshold value A may be compared. Therefore, the current steering is not steering from a steering holding state that has continued for a predetermined time or more, or the absolute value of the steered angle velocity of the front wheels 1 (or the rear wheels 2) is at least the threshold value A or less. Therefore, if "No" is determined in S2, the routine shown in the flowchart of FIG. 3 is terminated without executing the control of the subsequent steps.

On the other hand, the current steering is steering from a steering holding state that has continued for a predetermined time or more, and the absolute value of the steered angle velocity of the front wheels 1 (or the rear wheels 2) is higher than the threshold value A, that is, when it is determined that the first steering is to be performed, and the determination in S2 is "Yes", the process proceeds to the next step S3.

In S3, it is determined whether the second steering is to be performed. Specifically, the current steering is steering within a predetermined time from the first steering (that is, not steering from a steering holding state that has continued for a predetermined time or longer), and is steering in the opposite direction to the first steering, and is determined whether the absolute value of the steered angle velocity of the front wheel 1 steered according to the steering is higher than a predetermined threshold value B (second threshold value). When the current steering is steering within a predetermined time from the first steering, is steering in the opposite direction to the first steering, and the absolute value of the steered angle velocity of the front wheels 1 is higher than the threshold value B, it is determined that the second steering is performed. Also in this case, instead of the steered angle velocity of the front wheels 1, the absolute value of the steered angle velocity of the rear wheels 2 and the threshold value B may be compared. The threshold value B is a threshold value corresponding to the "second threshold value" in the embodiment of this present disclosure. Further, the threshold value B is set in advance, like the threshold value A described above, based on, for example, a driving test using an actual vehicle, a simulation result, or the like. Therefore, the current steering is steering from a steering holding state that has continued for a predetermined time or more from the first steering, or is steering in the same direction as the first steering, or the front wheel 1 (or rear wheel 2) is being steered. If the absolute value of the steered angle velocity is at least one of the threshold values B or less, and thus the determination is "No" in S3, the control of each subsequent step is not executed. The routine shown in the flowchart of FIG. 3 is temporarily terminated.

On the other hand, the current steering is the steering within the predetermined time from the first steering, the steering in the direction opposite to the first steering, and the steered angle velocity of the front wheels 1 (or the rear wheels 2). If the absolute value is higher than the threshold value B, that is, if it is determined that the second steering is to be performed, and the determination is "Yes" in S3, the process proceeds to the next step S4.

Figure 4:
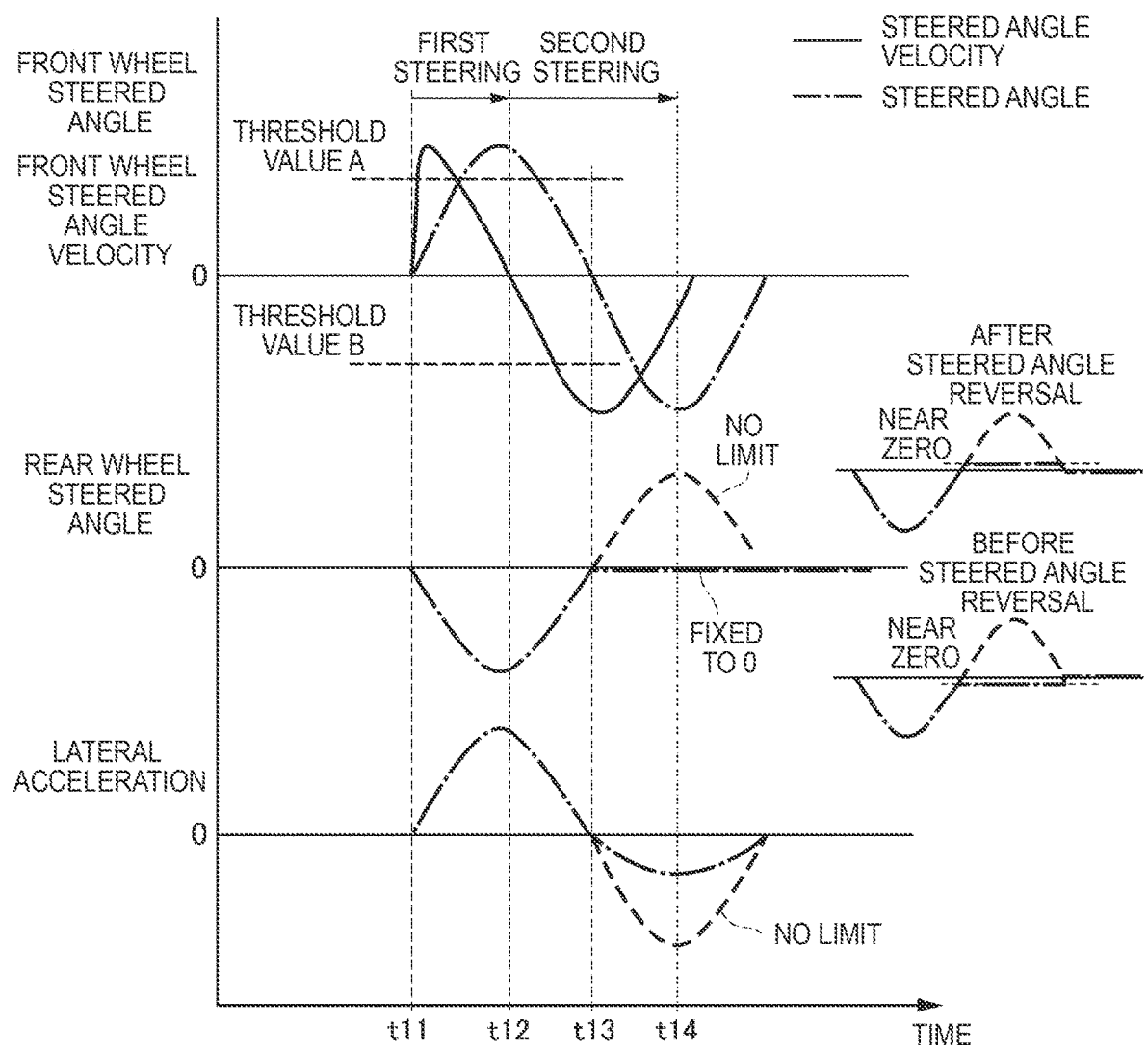
FIG. 4 shows the contents of the control shown in the flowchart of FIG. 3 (an example of fixing the steered angle of the rear wheels in the second steering in the vicinity of zero), and is a time chart for explaining the effect when the control is executed.

In S4, steering of the rear wheels 2 is restricted. For example, as shown in the time chart of FIG. 4, steering of the rear wheels 2 is restricted by fixing the steered angle of the rear wheels 2 at or near zero. The time chart of FIG. 4 shows a control example when the vehicle Ve is traveling at a low vehicle speed less than the low speed determination threshold. When the first steering is performed in the period from time t11 to time t12, the front wheels 1 and the rear wheels 2 are steered corresponding to the first steering. In this case, the front wheels 1 and the rear wheels 2 are steered in opposite phases. The first steering is steering in which the absolute value of the steered angle velocity of the front wheels 1 that are steered corresponding to the first steering exceeds the threshold value A. At time t12, the steering direction is reversed, and steering in the direction opposite to the first steering is continuously performed (that is, within a predetermined period of time), the period from time t12 to time t14 with time t13 interposed therebetween becomes the second steering. Time t13 is the time when the steered angles of the front wheels 1 and the rear wheels 2 become zero (return to the origin). Time t14 is the time when the steering directions of the front wheels 1 and the rear wheels 2 are reversed. This second steering is steering in which the absolute value of the steered angle velocity of the front wheels 1 that are steered corresponding to the second steering exceeds the threshold value B. Therefore, the turning of the rear wheels 2 in the second steering is restricted because the execution determination conditions for both the first steering and the second steering are satisfied. In the example shown in the time chart of FIG. 4, the steered angle of the rear wheels 2 in the second steering is fixed at zero or near zero after time t13. As shown in the image on the right side of FIG. 4, when the steered angle of the rear wheels 2 is fixed near zero, the value of the steering angle is fixed near zero of one of front and rear at which the steering direction of the rear wheel 2 is inversed In addition to fixing the steered angle of the rear wheels 2 to 0 or near 0, for example, the value of the steered angle of the rear wheels 2 may be fixed within an arbitrary predetermined angle range. Steering of wheels 2 may be restricted. In this case, the predetermined angle range is set in advance to an appropriate value at which the effect of restricting the steering of the rear wheels 2 can be obtained, for example, based on the results of running tests using actual vehicles, simulation results, and the like.

As described above, the steered angle of the rear wheels 2 in the second steering is fixed at zero or near zero, or is fixed within a predetermined angle range, so that as compared with a case in which the steering of the rear wheels 2 is not restricted after time t13, the lateral acceleration acting on the vehicle Ve is reduced. Therefore, the occurrence of resonance as described above can be avoided, and the behavior of the vehicle Ve can be stabilized.

Figure 5:
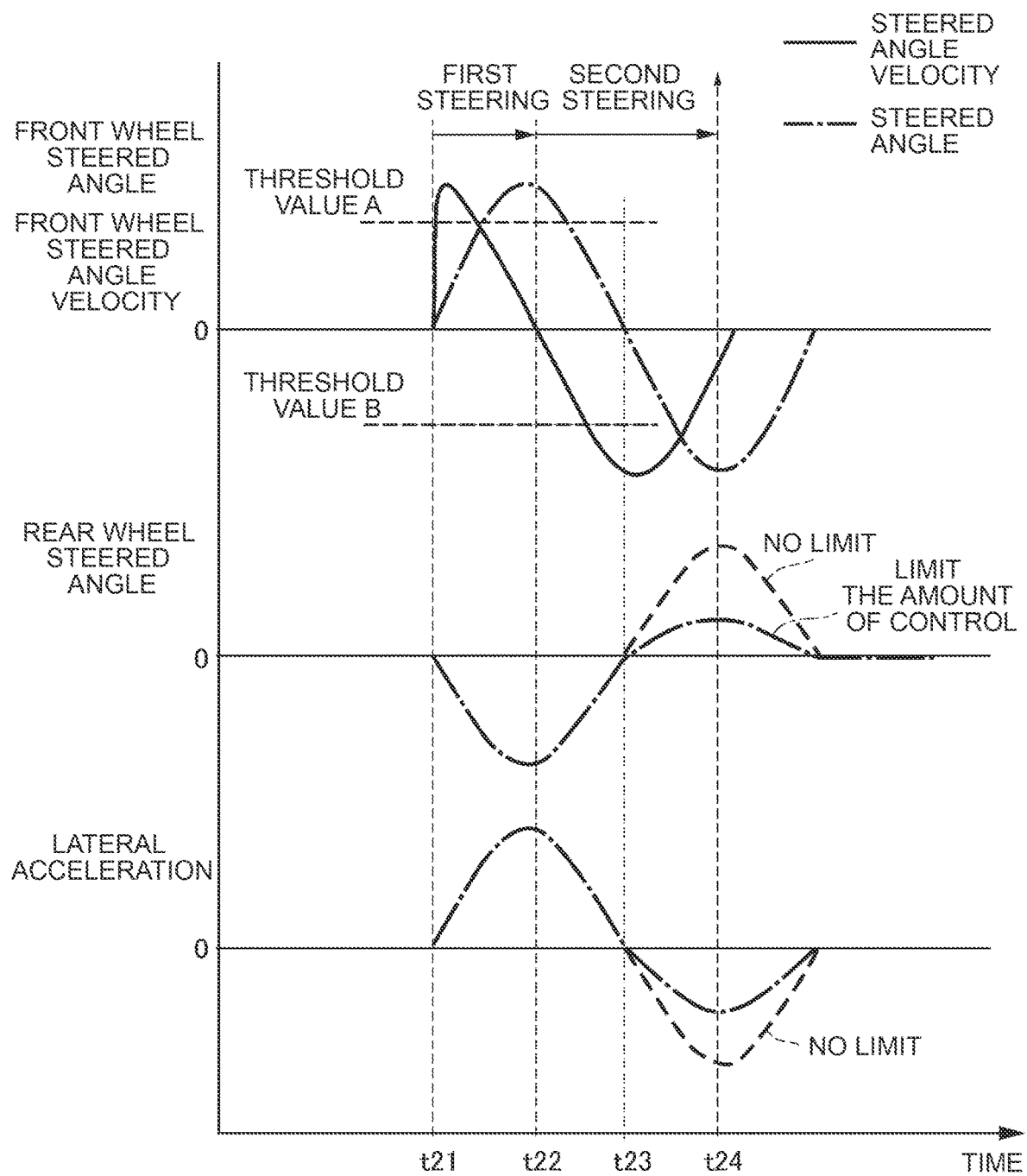
FIG. 5 shows the contents of the control shown in the flowchart of FIG. 3 (an example of suppressing the control amount of the steered angle of the rear wheels in the second steering), and is a time chart for explaining the effect when the control is executed.

Also, in S4, for example, as shown in the time chart of FIG. 5, by restricting the control amount of the rear wheel 2, that is, restricting the steered amount of the rear wheel 2 or the change amount of the steered angle of the rear wheel 2, the steering of the rear wheels 2 may be restricted. Similar to the time chart of FIG. 4, the time chart of FIG. 5 shows an example of control when the vehicle Ve is running at a low speed lower than the low speed determination threshold. When the first steering is performed in the period from time t21 to time t22, the front wheels 1 and the rear wheels 2 are steered corresponding to the first steering. In this case, the front wheels 1 and the rear wheels 2 are steered in opposite phases. The first steering is steering in which the absolute value of the steered angle velocity of the front wheels 1 that are steered corresponding to the first steering exceeds the threshold value A. At time t22, the steering direction is reversed, and steering in the direction opposite to the first steering is continuously performed (that is, within a predetermined time), the period from time t22 to time t24 with time t23 interposed therebetween becomes the second steering. Time t23 is the time when the steered angles of front wheels 1 and rear wheels 2 become 0 (return to the origin). Time t24 is the time when the steering directions of front wheels 1 and rear wheels 2 are reversed. This second steering is steering in which the absolute value of the steered angle velocity of the front wheels 1 that are steered corresponding to the second steering exceeds the threshold value B. Therefore, the turning of the rear wheels 2 in the second steering is restricted because the execution determination conditions for both the first steering and the second steering are satisfied. In the example shown in the time chart of FIG. 5, after time t23, the amount of change in the steered angle of the rear wheels 2 in the second steering is suppressed.

In this case as well, by suppressing the amount of change in the steered angle of the rear wheels 2 in the second steering, after time t23, compared to the case where the steering of the rear wheels 2 is not restricted, the vehicle Ve Applied lateral acceleration is reduced. Therefore, the occurrence of resonance as described above can be avoided, and the behavior of the vehicle Ve can be stabilized.

After the steering of the rear wheels 2 in the second steering is restricted in S4 as described above, the routine shown in the flowchart of FIG. 3 is terminated.

Figure 6:
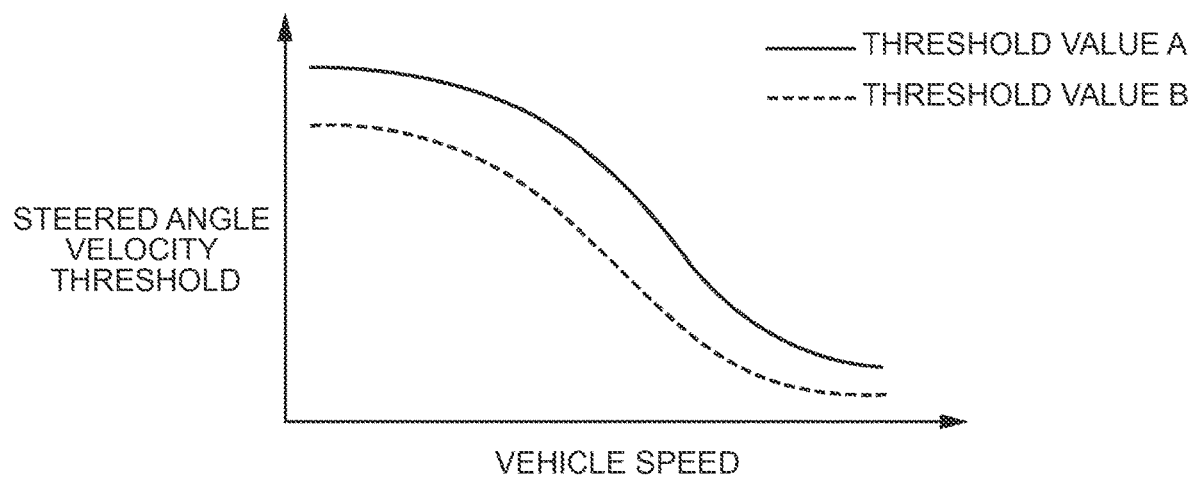
FIG. 6 is a diagram showing an image of the threshold for the steered angle velocity (an example of a map for changing the threshold according to the vehicle speed) for determining the steering state in which resonance may occur.

In the control example described above, the states of the first steering and the second steering are determined using both the threshold value A and the threshold value B for the steered angle velocity as preset values. On the other hand, in the four-wheel steering vehicle control device according to the embodiment of the present disclosure, the threshold value A and the threshold value B may be changed according to the vehicle speed. For example, as shown in FIG. 6, the threshold value A and the threshold value B may be changed and set so as to decrease as the vehicle speed increases. The lateral acceleration of the vehicle Ve caused by steering changes depending on the vehicle speed. When the front wheels 1 and the rear wheels 2 are steered in opposite phases, the higher the vehicle speed, the greater the lateral acceleration of the vehicle Ve caused by steering. Therefore, a map such as that shown in FIG. 6 is applied, and the higher the vehicle speed, that is, the higher the possibility that a large lateral acceleration is output, the threshold is reduced, and the control described above (control in which the steering of the rear wheel 2 in the second steering is restricted) is easily executed. As a result, it is possible to prevent the steering of the rear wheels 2 from being restricted more than necessary, and it is possible to appropriately execute the control according to the running state of the vehicle Ve.

As described above, in the control device for a four-wheel steering vehicle according to the embodiment of the present disclosure, even if the first steering and the second steering, which may cause resonance, are continuously performed, the second steering By limiting the steering of the rear wheels 2 at, it is possible to suppress the occurrence of resonance. Therefore, according to the four-wheel steering vehicle control device of the embodiment of the present disclosure, the occurrence of resonance is suppressed and the four-wheel steering of the front wheels 1 and the rear wheels 2 is performed appropriately regardless of the vehicle speed and steering state. It can be carried out.

What is claimed is:

1. A control device for a four-wheel steering vehicle, the control device comprising a processor, wherein the four-wheel steering vehicle includes:
- a steering wheel configured to be operated by a driver;
- a front actuator configured to turn front wheels;
- a rear actuator configured to turn rear wheels; and
- a sensor configured to detect a first steered angle velocity of the front wheels and a second steered angle velocity of the rear wheels, the processor is configured to:
- control the front actuator and the rear actuator based on operation of the steering wheel;
- determine whether a first steering in which the steering wheel is operated in a first direction is performed;
- determine whether a second steering in which the steering wheel is operated in a second direction is performed, the second direction being a direction opposite to the first direction;
- determine whether the rear wheels are turned in a direction opposite to the front wheels;
- compare an absolute value of the first steered angle velocity or the second steered angle velocity detected during the first steering with a predetermined first threshold value;
- compare an absolute value of the first steered angle velocity or the second steered angle velocity detected during the second steering with a predetermined second threshold value;
- fix a steered angle of the rear wheels to zero or within a predetermined angle range; and
- restrict turning of the rear wheels in response to the second steering in a case where:
  - determination is made that the first steering has been performed, the second steering is being performed, and the rear wheels are steered in the direction opposite to the front wheels,
  - the absolute value of the first steered angle velocity or the second steered angle velocity detected during the first steering is higher than the first threshold value, and
  - the absolute value of the first steered angle velocity or the second steered angle velocity detected during the second steering is higher than the second threshold value.

2. The control device according to claim 1, wherein the processor is further configured to;
- determine whether a steering holding state continues for a predetermined period or longer after the first steering is performed, the steering holding state being a state in which a steering speed of the steering wheel decreases or is zero, and
- set steering for operating the steering wheel in any direction to the first steering again after the steering holding state, in a case where determination is made that the steering holding state continues for the predetermined period or longer.

3. The control device according to claim 1, wherein the processor is further configured to change magnitudes of the first threshold value and the second threshold value based on a vehicle speed of the four-wheel steering vehicle.

4. The control device according to claim 3, wherein the processor is further configured to reduce the magnitudes of the first threshold value and the second threshold value as the vehicle speed increases.

5. The control device according to claim 2, wherein the processor is further configured to change magnitudes of the first threshold value and the second threshold value based on a vehicle speed of the four-wheel steering vehicle.

6. The control device according to claim 5, wherein the processor is further configured to reduce the magnitudes of the first threshold value and the second threshold value as the vehicle speed increases.

* * * * *